United States Patent
Nadler et al.

(10) Patent No.: US 10,616,206 B2
(45) Date of Patent: Apr. 7, 2020

(54) DIGITAL CERTIFICATE FOR VERIFYING APPLICATION PURPOSE OF DATA USAGE

(71) Applicant: International Business Machines Corporation, Armonk, NY (US)

(72) Inventors: Sima Nadler, Kochav Yair (IL); Abigail Goldsteen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/276,815

(22) Filed: Sep. 27, 2016

(65) Prior Publication Data

US 2018/0091497 A1  Mar. 29, 2018

(51) Int. Cl.
*H04L 29/06* (2006.01)
*G06F 21/10* (2013.01)

(52) U.S. Cl.
CPC .......... *H04L 63/0823* (2013.01); *G06F 21/10* (2013.01); *H04L 63/10* (2013.01)

(58) Field of Classification Search
CPC ...... H04L 63/0823; H04L 63/10; G06F 21/10
USPC ........................................................ 713/156
See application file for complete search history.

(56) References Cited

U.S. PATENT DOCUMENTS

| | | | |
|---|---|---|---|
| 7,337,429 B1 | 2/2008 | Psaras et al. | |
| 8,195,933 B2 * | 6/2012 | Benantar | G06F 21/33 380/277 |
| 8,205,266 B2 * | 6/2012 | Pfitzmann | G06F 21/10 380/201 |
| 8,468,585 B2 * | 6/2013 | Choi | G06F 21/33 726/5 |
| 8,572,368 B1 * | 10/2013 | Deacon | G06F 21/64 713/158 |
| 8,788,316 B1 * | 7/2014 | Karnik | G06Q 30/0206 705/7.35 |
| 8,959,337 B2 * | 2/2015 | Dixon | H04L 63/20 713/156 |
| 8,997,054 B2 | 3/2015 | Huff et al. | |
| 9,137,023 B1 | 9/2015 | Hackborn et al. | |

(Continued)

FOREIGN PATENT DOCUMENTS

CN  103078858  8/2015

OTHER PUBLICATIONS

Larry Seltzer., "Securing Your Private Keys as Best Practice for Code Signing Certificates", by IT Manager Daily Page on Apr. 1, 2015, Can be found at: https://www.thawte.com/code-signing/whitepaper/best-practices-for-code-signing-certificates.pdf.

*Primary Examiner* — Michael Pyzocha
*Assistant Examiner* — Zoha Piyadehghibi Tafaghodi
(74) *Attorney, Agent, or Firm* — G. E. Ehrlich

(57) ABSTRACT

A method of creating an application purpose certificate, comprising: receiving from a software publisher an application code and declared privacy information, the declared privacy information includes at least one allowed usage purpose for each of a plurality of data types; analyzing the application's usage of data of each of the plurality of data types; verifying the usage is compliant with the least one allowed usage purpose according to the analysis; creating an encrypted digital purpose certificate, the digital purpose certificate is unique for the application code; and sending the digital purpose certificate to the software publisher to be bundled with the application code and a publisher authentication certificate.

20 Claims, 4 Drawing Sheets

(56) References Cited

U.S. PATENT DOCUMENTS

| | | | | |
|---|---|---|---|---|
| 2003/0130947 | A1* | 7/2003 | Benantar | G06F 21/33 |
| | | | | 705/44 |
| 2006/0005237 | A1* | 1/2006 | Kobata | H04L 63/0823 |
| | | | | 726/12 |
| 2006/0010500 | A1* | 1/2006 | Elazar | G06F 21/10 |
| | | | | 726/27 |
| 2006/0190413 | A1* | 8/2006 | Harper | G06F 21/10 |
| | | | | 705/65 |
| 2010/0287609 | A1* | 11/2010 | Gonzalez | G06F 21/10 |
| | | | | 726/14 |
| 2011/0145568 | A1* | 6/2011 | Clement | H04L 63/0823 |
| | | | | 713/156 |
| 2013/0046988 | A1 | 2/2013 | Saidhana | |
| 2014/0258711 | A1 | 9/2014 | Brannon | |
| 2015/0278486 | A1* | 10/2015 | Huang | H04L 9/3247 |
| | | | | 726/1 |
| 2015/0302182 | A1* | 10/2015 | Wyatt | G06F 21/564 |
| | | | | 726/26 |
| 2015/0304112 | A1* | 10/2015 | Langman | G06F 8/61 |
| | | | | 713/179 |

* cited by examiner

DIGITAL CERTIFICATE FOR VERIFYING APPLICATION PURPOSE OF DATA USAGE

BACKGROUND

The present invention, in some embodiments thereof, relates to authentication of software application purpose and, more specifically, but not exclusively, to verifying usage of data for specific purposes using digital certificate.

Digital certificates are used today to verify authenticity of applications and their publishers, authenticity of servers, clients and/or other online entities, by a trusted authority.

In the process of code signing, i.e. authentication of a software publisher, a publisher's public key is sent to a trusted certificate authority (CA) which encrypts it with its own private key to create a publisher authentication certificate. This certificate is bundled by the publisher with the application code together with a hash created from the code and encrypted using the publisher's private key. When a user's client opens the bundle, it verifies its authenticity. By using the CA's public key, the certificate is decrypted and the publisher's public key is extracted. The publisher's public key is then used to decrypt the hash. The hash may then be compared to a current hash created by the user's client, to verify that they are the same.

Different privacy regulations mandate that users' personal data may be processed by applications/services only for the declared purpose for which the data was collected and that was consented by the user. Data collected by an application/service is often shared with third parties for outsourcing, data sharing or even profit. The data collectors are, in many cases, responsible for assuring that the data is only used for the consented purposes, both internally and even after being transferred to third parties.

SUMMARY

According to an aspect of some embodiments of the present invention there is provided a method of creating an application purpose certificate, comprising: receiving from a software publisher an application code and declared privacy information, the declared privacy information includes at least one allowed usage purpose for each of a plurality of data types; analyzing the application's usage of data of each of the plurality of data types; verifying the usage is compliant with the least one allowed usage purpose according to the analysis; creating an encrypted digital purpose certificate, the digital purpose certificate is unique for the application code; and sending the digital purpose certificate to the software publisher to be bundled with the application code and a publisher authentication certificate.

Optionally, the digital purpose certificate includes a digital hash of the application code.

Optionally, the digital purpose certificate includes the declared privacy information.

Optionally, the digital purpose certificate includes encrypted version of the at least one allowed usage purpose.

Optionally, the digital purpose certificate is created using public-key cryptography.

Optionally, the digital hash of the application code and the declared privacy information are encrypted using the same private key.

Optionally, the declared privacy information is received as data exchange format file.

Optionally, at least some of the analyzing is done by automated algorithms.

Optionally, at least some of the analyzing is done using input received by a human interface.

According to some embodiments of the invention there is provided a computer readable medium comprising computer executable instructions adapted to perform the method.

According to an aspect of some embodiments of the present invention there is provided a software program product for creating an application purpose certificate, comprising: a non-transitory computer readable storage medium; first program instructions for receiving from a software publisher an application code and declared privacy information, the declared privacy information includes at least one allowed usage purpose for each of a plurality of data types; second program instructions for analyzing the application's usage of data of each of the plurality of data types; third program instructions for verifying the usage is compliant with the least one allowed usage purpose according to the analysis; and fourth program instructions for creating an encrypted digital purpose certificate, the digital purpose certificate is unique for the application code; wherein the first, second, third and fourth program instructions are executed by at least one computerized processor from the non-transitory computer readable storage medium.

According to an aspect of some embodiments of the present invention there is provided a system creating an application purpose certificate, comprising: a communication module for receiving from a software publisher an application code and declared privacy information, the declared privacy information includes at least one allowed usage purpose for each of a plurality of data types; an analysis module for: analyzing the application's usage of data of each of the plurality of data types; and verifying the usage is compliant with the least one allowed usage purpose according to the analysis; and an encryption module for creating an encrypted digital purpose certificate, the digital purpose certificate is unique for the application code.

According to an aspect of some embodiments of the present invention there is provided a method of verifying purpose of data usage during runtime, comprising: receiving from an application a query for data and an encrypted purpose token, the purpose token includes at least one allowed usage purpose for each of a plurality of data types; decrypting the encrypted declared privacy information; verifying permission of the application to access at least some of the queried data based on the plurality of usage purposes and data types; and sending the at least some of the queried data to the application.

Optionally, the purpose token is encrypted using a private key of a current runtime environment and the decrypting is done using a paired public key of the private key.

Optionally, the at least some of the queried data includes obfuscated version of the queried data.

Optionally, the verifying includes comparing the purpose token to user preferences stored in a dataset.

According to some embodiments of the invention there is provided a computer readable medium comprising computer executable instructions adapted to perform the method.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
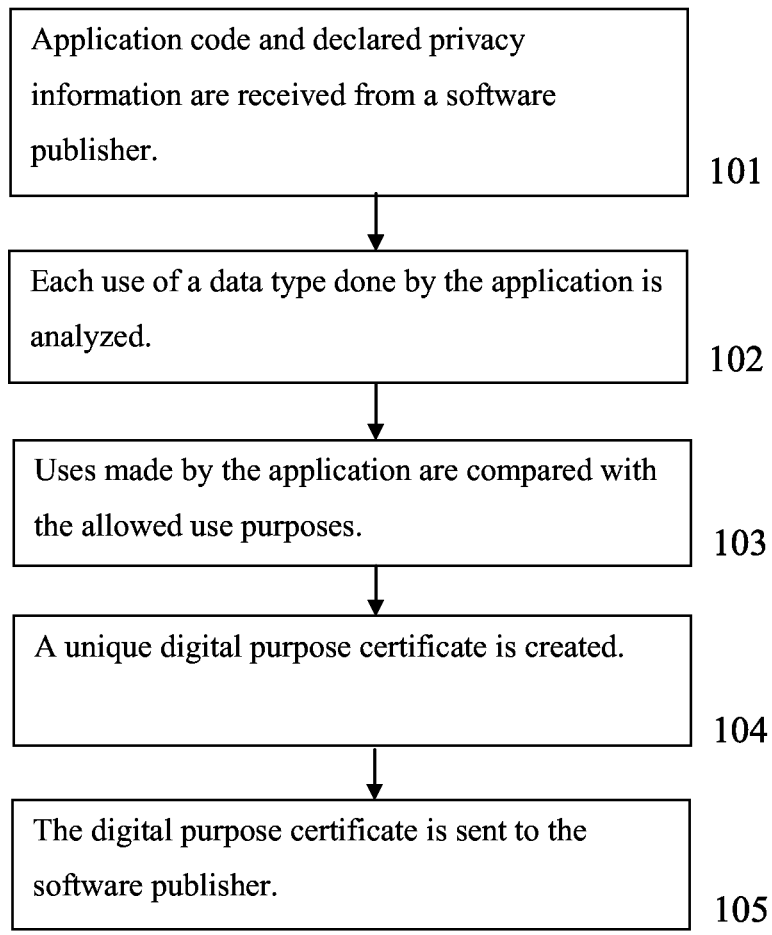
FIG. 1 is a flowchart schematically representing a method for creating an application purpose certificate, according to some embodiments of the present invention.

The present invention, in some embodiments thereof, relates to authentication of software application purpose and, more specifically, but not exclusively, to verifying usage of data for specific purposes using digital certificate.

Data collected by an application, such as a program and/or a service, may be used by the original application as well as others for many different purposes. Although intended purposes of using the collected data are usually declared to the user and approved by him (often in the form of a legal document), the user and/or enterprise has no way of verifying that the data is only used for the approved purposes.

According to some embodiments of the present invention, there are provided methods and systems for validating the usage of each type of data by a specific application for a specified purpose or purposes. This is done by a trusted authority, an application purpose certifier, which may include human experts and/or automatic algorithms. According to the proposed methods and systems, the application's code and the declared usage purpose(s) of each data type are sent by the application's publisher to the application purpose certifier. The certifier checks how the application is using each data type, and verifies that each of the uses is defined in the declared usage purposes for this data type. When all uses actual uses are in accordance with the declared purposes, the certifier issues a purpose certificate, which includes a hash of the application's code and declared purposes, both encrypted by the certifier's private key. Users of the application may then trust that their data is only used for the declared purposes. This end-to-end process also ensures that an application cannot fake purposes nor re-use purpose certificates assigned to a different application.

Optionally, an encrypted version of the declared usage purposes may be used during runtime of the application to verify each usage of data in real-time. For every usage of data, the application sends a query, along with the encrypted purposes to a data access manager. The data types are approved according to the purposes, for example by a privacy manager which decrypts the purposes and compares them to policies and/or contracts. Only then, the data access manager sends the queried data back to the application.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
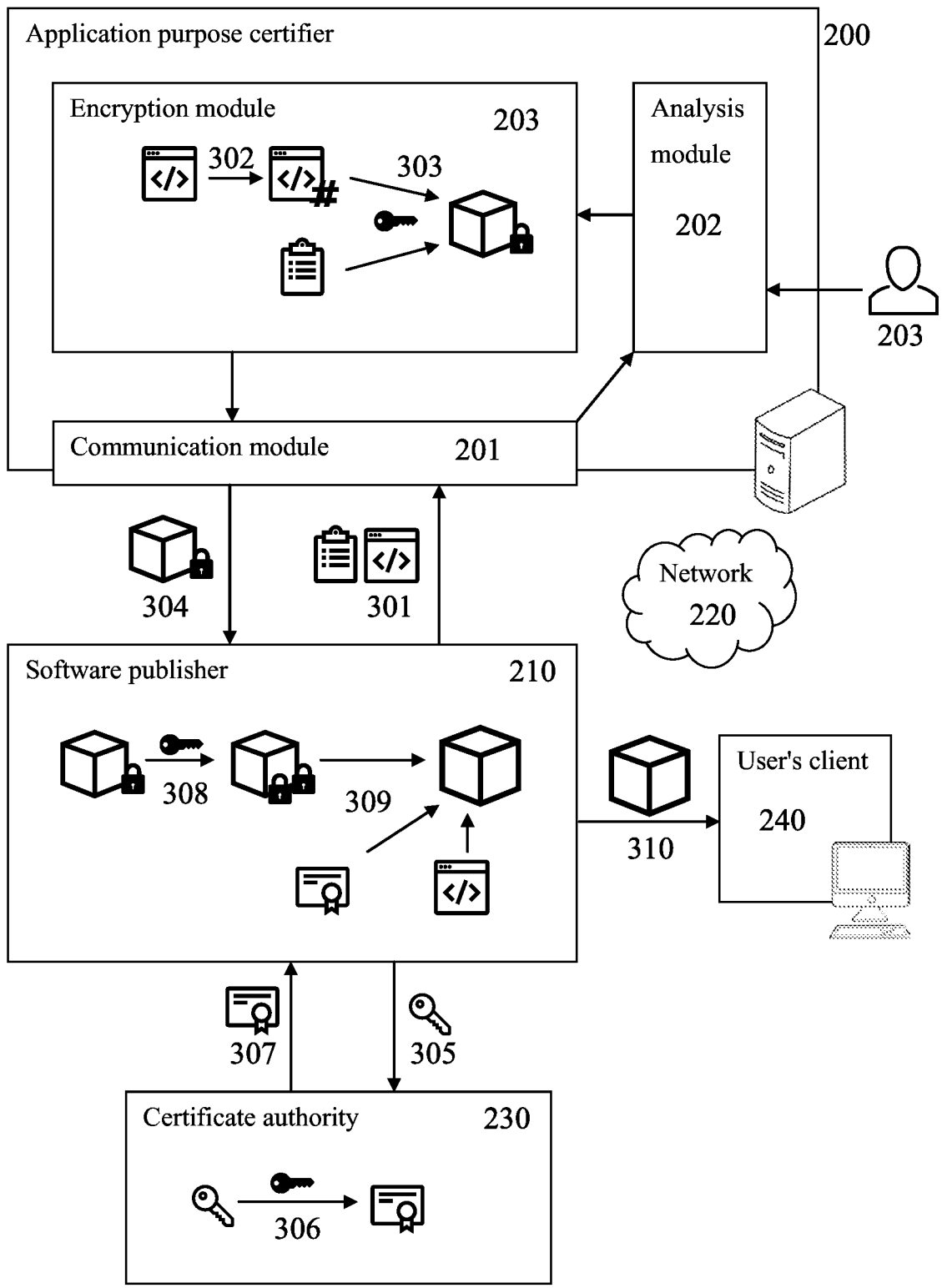
FIG. 2 is a schematic illustration of a system of creating an application purpose certificate, according to some embodiments of the present invention.

Referring now to the drawings, FIG. 1 is a flowchart schematically representing a method for creating an application purpose certificate, according to some embodiments of the present invention. Reference is also made to FIG. 2, which is a schematic illustration of a system of creating an application purpose certificate, according to some embodiments of the present invention.

First, as shown at 101 and 301, system 200, also referred to as application purpose certifier 200, receives from a software publisher 210 a network message that includes an application's code and declared privacy information. The declared privacy information includes allowed usage purpose(s) for each type of data collected. This may be done by a communication module 201, such as a network card or chip, connected to software publisher 210 via a network 220.

Application purpose certifier 200 may be implemented by one or more computer systems, for example connected via a network. The computer system(s) may include one or more hardware computing devices, for example, a mainframe computer, an enterprise server, a workstation, multiple connected computers, a virtual machine and/or a personal computer.

Data types may include, for example, user personal information such as name, age, gender, email and/or phone number, data extracted from the user's client such as location history, call log and/or browsing history, data collected during the operation of the application such as usage patterns, entered data and/or activity log and/or any other type of data not initially included in the application.

User's client may include, for example, a personal computer, a workstation, a mobile device such as a Smartphone, a tablet, a wearable device such as Google glass, a Smart watch, a laptop computer and/or the like, an internet of things (IoT) device and/or any device that has one or more network communication modules, such as a network card or chip.

The allowed usage purposes may include, for example, providing specific services such as, diabetes research, offering product information, transferring the data to a third party to provide advertisements and/or any other usage of the data. Optionally, the allowed usage purposes may include time limit for using and/or storing data.

Optionally, the allowed usage purposes are provided by software publisher 210 as structured data, for example as data exchange format file such as json and/or xml file. Optionally, the allowed usage purposes are structured by software publisher 210 using a software tool. For example, the tool may provide a platform for defining usage purposes and defining data items that are used for each of these usage purposes. The information may be stored in a dataset and converted to a data exchange format before transferred to application purpose certifier 200.

Network 220 may include, for example, local area network (LAN), a wireless network such as mobile network, wireless local area network (WLAN) such as Wireless Fidelity (WiFi™), a wireless personal area network (WPAN) such as Bluetooth™ protocol and/or any other network. Network 220 may be local, for example an internal network of an organization, or may be a general network, such as the internet.

Then, as shown at 102, each usage of a data type done by the application is analyzed. This may be done by an analysis module 202, which may include analysis algorithms and/or interface for human expert(s) 203. Experts may include, for example, product management, product development, and a company's privacy officer. Optionally, the general behavior of the application is also analyzed by analysis module 202.

The analysis algorithms may scan the application code to identify APIs via which data is sent/received and compare to API purpose list generated over time as many applications are scanned, while suspicious APIs may be presented to human review and purpose tagging. An API for sending data to and external party may indicate possible inappropriate use of the data. For example, mobile flashlight applications that send location information to an external server are using data outside of the declared purpose of the application.

The analysis algorithms may scan the application code to identify package and variable names that might hint at purposes other than those being certified, while suspicious names may be presented to human review.

Then, as shown at 103, the actual uses made by the application, according to the analysis, are compared with the allowed usage purposes for each data type.

Then, as shown at 104, when all of the data uses of the application are compliant with the allowed usage purposes, a digital purpose certificate is created by an encryption module 203. The purpose certificate includes a digital signature that may be created using public-key cryptography according to public key infrastructure (PKI). The digital purpose certificate is unique for the specific application code, as it contains indication of the allowed usage purpose(s) and an indication of the code, such as a hash.

Optionally, the purpose certificate includes a hash of the application code, so the certificate is specific only to the exact application code examined. As shown at 302, the application code is hashed using a hashing algorithm, which may include, for example, SHA-3, SHA-2, SHA-1, MD5, FIPS, BLAKE, BLAKE2, and/or any other algorithm.

Optionally, the purpose certificate includes the declared privacy information. Optionally, the purpose certificate includes a hash of the declared privacy information.

As shown at 303, the hash of the application code and the declared privacy information are encrypted using a private key of application purpose certifier 200 and combined into a bundle.

The purpose certificate may include other details, for example, serial number, the algorithm used to create the signature, the date the certificate is first valid from, an expiration date, the public key and/or any other information, for example according to the X.509 cryptography standard.

Then, as shown at 105 and 304, the digital purpose certificate is sent as a network message by communication module 201 to software publisher 220. Optionally, the digital purpose certificate is distributed and/or published by communication module 201, for example, when application purpose certifier 200 also acts as a software distributor and/or as a response to a request by a user's client before installing the application.

Optionally, code signing is done by a certificate authority (CA) 230. As shown at 305-307, CA 230 receives a public key of software publisher 220 from software publisher 220, encrypts it with its private key and signs to create a digital publisher authentication certificate which it sends back to software publisher 220.

Optionally, software publisher 220 encrypts the purpose certificate, as shown at 308, and combines it with the application code and the publisher authentication certificate into an application bundle, as shown at 309. When the purpose certificate includes a hash of the declared privacy information, software publisher 220 may also include the full declared privacy information into an application bundle. Software publisher 220 then distributes the application bundle to users' clients, as shown at 310.

Figure 3:
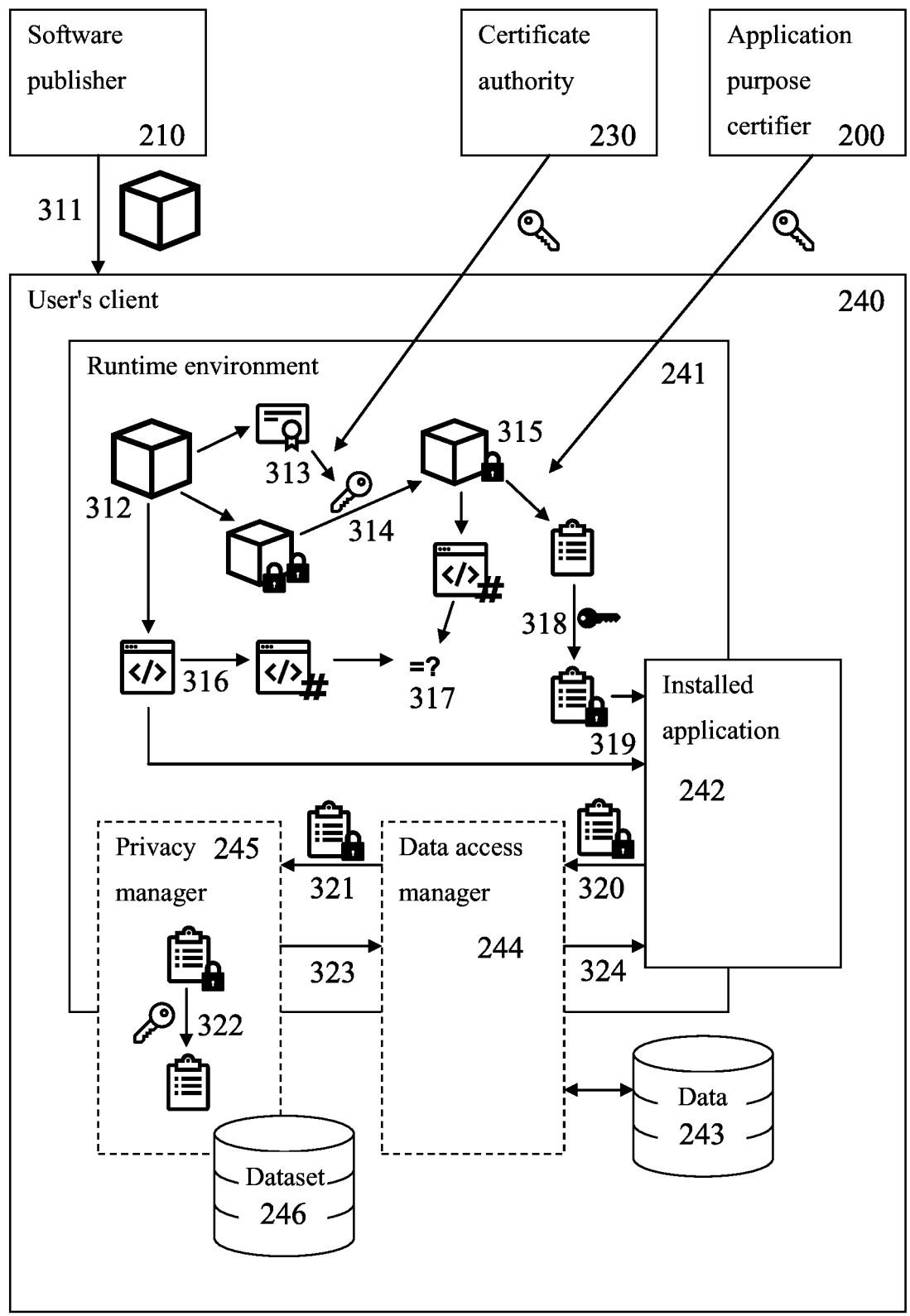
FIG. 3 is a schematic illustration of a user's client which installs and runs an application using an purpose certificate, according to some embodiments of the present invention.

Reference is now made to FIG. 3, which is a schematic illustration of a user's client which installs and runs an application using an application purpose certificate, according to some embodiments of the present invention.

User's client 240 includes a runtime environment 241, which is trusted, such as a trusted OS, docker container and/or cloud platform. Trust may be established either in advance by exchanging public keys, or by use of an additional certificate authenticating the runtime environment 241.

For installing the application on user's client 240, the application bundle is opened (311) by runtime environment 241 to extract the application code, the purpose certificate and the publisher authentication certificate. Using a public key received from CA 230, the publisher authentication certificate is decrypted to extract the publisher's public key (313). The publisher's public key is used to decrypt the purpose certificate (314). Using a public key received from application purpose certifier 200, the purpose certificate is decrypted again to extract the hash of the application code and the declared privacy information (315). The application code is hashed (316) by runtime environment 241 and compared with the hash of the application code extracted from the purpose certificate (317), to authenticate the source of the application bundle and verify that the declared privacy information relates to the correct application code.

Optionally, the declared privacy information and/or the allowed usage purposes are encrypted using a private key of runtime environment 241 (318) to create a purpose token. The purpose token is included in the installation of the application code on user's client 240 (319). Optionally, the purpose certificate is used as a purpose token.

Optionally, the encrypted purpose token is used during runtime to verify each usage of data by the installed application 242 for an allowed purpose.

Figure 4:
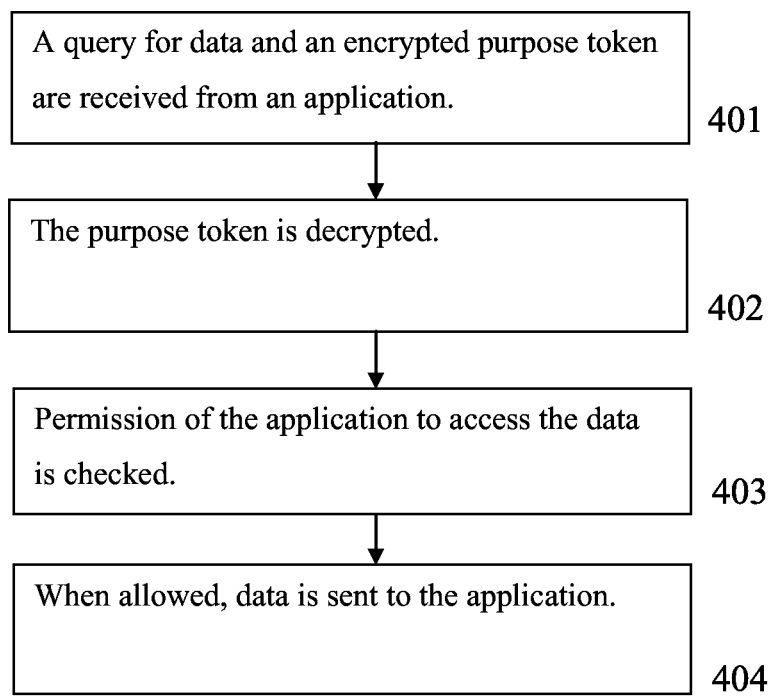
FIG. 4 is a flowchart schematically representing a method of verifying purpose of data usage during runtime, according to some embodiments of the present invention.

Reference is now made to FIG. 4, which is a flowchart schematically representing a method of verifying purpose of data usage during runtime, according to some embodiments of the present invention.

When installed application 242 requires using data 243, it sends a data query which is intercepted by the data access manager 244, along with the encrypted purpose token, as shown at 401 and 320. Data access manager 244 sends the encrypted purpose token and data types being queried to a privacy manager 245 (321). The data information may include, for example, data owner, fields being queried (without their values) and/or any other information.

Privacy manager 245 decrypts the encrypted purpose token as shown at 402 and 322. Due to the certification process described and the trusted runtime environment associated with it, privacy manager 245 knows that the purpose declared is valid. Privacy manager 245 then checks whether the application is allowed access to the queried data for an allowed purpose as indicated in the declared privacy information, as shown at 403. This may be done, for example, by comparing the declared privacy information to compares it with the relevant services, policies and/or consent contracts.

Optionally, the user's preferences for how data is allowed to be used for the different purposes are stored in a dataset 256 of privacy manager 245. Privacy manager 245 may compare the user's preferences to the purpose token and the queried data and decides if the allowed purpose is consistent with user's preferences for the queried data.

When a decision is made, privacy manager 245 sends the decision to data access manager 244 (323). The decision may include, for example, approval of access, denial of access and/or approval of access only to an obfuscated version of the queried data. Obfuscation may include generalization, anonymization, masking or removal of certain data and/or other such techniques.

When access is approved, data access manager 244 sends the requested data to installed application 242, as shown at 404 and 324. When access to anonymized version of the queried data is approved, data access manager 244 anonymizes the data by deleting or altering information and sends the obfuscated version to installed application 242.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant digital certificates will be developed and the scope of the terms certificate and encryption are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of improving a privacy protection in data usage by an application by creating an application purpose certificate, comprising:
   receiving from a software publisher an application code and declared privacy information;
   extracting from said declared privacy information, information specifying for each data type of a plurality of data types of data received or sent by said application, at least one use purpose allowed for said application to use said received or sent data of said each data type, wherein said allowed use purpose is predefined as an intended use consented as allowed for respective said each data type used by said application;
   scanning and analyzing said application code to identify for each of said plurality of data types, a use purpose as used by said application;
   for each of said plurality of data types, comparing said identified use purpose with said declared privacy information, to determine when said usage is compliant with said at least one allowed usage purpose;
   in response and according to said determination of compliancy, creating an encrypted digital purpose certificate, said digital purpose certificate certifies that said application uses data of each of said data types for purposes that are in compliance with said at least one allowed usage purpose, said digital purpose certificate is unique for said application code; and sending said digital purpose certificate to said software publisher to be bundled with said application code and with a publisher authentication certificate;

wherein said encrypted digital purpose certificate is used by a user client installing said application, to prevent un-allowed use of data associated with said declared privacy information by said application.

2. The method of claim 1, wherein said digital purpose certificate includes a digital hash of said application code.

3. The method of claim 1, wherein said digital purpose certificate includes said declared privacy information.

4. The method of claim 1, wherein said digital purpose certificate includes encrypted version of said at least one allowed usage purpose.

5. The method of claim 1, wherein said digital purpose certificate is created using public-key cryptography.

6. The method of claim 1, wherein said digital hash of said application code and said declared privacy information are encrypted using the same private key.

7. The method of claim 1, wherein said declared privacy information is received as data exchange format file.

8. The method of claim 1, wherein at least some of said analyzing is done by automated algorithms.

9. The method of claim 1, wherein at least some of said analyzing is done using input received by a human interface.

10. The method of claim 1, wherein each of said plurality of data types is a member of a group consisting of: user personal information, data extracted from a user client and data collected during an operation of said application.

11. The method of claim 10, wherein said user personal information is a member of a group consisting of: a user name, a user age, a user gender, a user email and a user phone number, wherein said data extracted from said user client is a member of a group consisting of: location history, call log and browsing history, and wherein said data collected during said operation of said application comprising at least one of usage patterns, entered data and activity log.

12. The method of claim 1, wherein said at least one allowed use purpose is a member of a group consisting of: providing specific services, offering product information and transferring the data to a third party to provide advertisements.

13. The method of claim 1 wherein said analyzing comprises analysis of at least one Application Programming Interface (API) code of said application code, said at least one API is responsible for receiving and sending data by said application.

14. A computer readable medium comprising computer executable instructions, that when executed by a hardware processor, cause said hardware processor to:

receive from a software publisher an application code and declared privacy information;

extract from said declared privacy information, information specifying for each data type of a plurality of data types of data received or sent by said application, at least one use purpose allowed for said application to use said received or sent data of said each data type, wherein said allowed use purpose is predefined as an intended use consented as allowed for respective said each data type used by said application;

scan and analyze said application code, to identify for each of said plurality of data types, a use purpose as used by said application;

for each of said plurality of data types, compare said identified use purpose with said declared privacy information, to determine when said usage is compliant with said at least one allowed usage purpose;

in response and according to said determination of compliancy, create an encrypted digital purpose certificate, said digital purpose certificate certifies that said application uses data of each of said data types for purposes that are in compliance with said at least one allowed usage purpose, said digital purpose certificate is unique for said application code; and send said digital purpose certificate to said software publisher to be bundled with said application code and with a publisher authentication certificate;

wherein said encrypted digital purpose certificate is used by a user client installing said application, to prevent un-allowed use of data associated with said declared privacy information by said application.

15. A system for improving a privacy protection in data usage by an application, by creating an application purpose certificate, comprising:

a program store storing code; and at least one hardware processor coupled to the program store for implementing the stored code, the stored code comprising:

code to receive from a software publisher an application code and declared privacy information;

code to extract from said declared privacy information, information specifying for each data type of a plurality of data types of data received or sent by said application, at least one use purpose allowed for said application to use said received or sent data of said each data type, wherein said allowed use purpose is predefined as an intended use consented as allowed for respective said each data type used by said application;

code to scan and analyze said application code, to identify for each of said plurality of data types, a use purpose as used by said application;

code to compare, for each of said plurality of data types, said identified use purpose with said declared privacy information, to determine when said usage is compliant with said at least one allowed usage purpose according to said analysis; and code to create, in response and according to said determined compliancy, an encrypted digital purpose certificate, said encrypted digital purpose certificate certifies that said application uses data of each of said data types for purposes that are in compliance with said at least one allowed usage purpose, said digital purpose certificate;

wherein said encrypted digital purpose certificate is used by a user client installing said application, to prevent un-allowed use of data associated with said declared privacy information by said application, said digital purpose certificate is unique for said application code.

16. A method of improving a privacy protection in data usage by an application by verifying purpose of data usage during runtime, comprising:

receiving from an application a query for data, requested for use by said application, and an encrypted purpose token of declared privacy information;

decrypting said encrypted declared privacy information;

extracting from said declared privacy information, information specifying for each data type of a plurality of data types of data received or sent by said application, at least one use purpose allowed for said application to use said received or sent data of said each data type, wherein said allowed use purpose is predefined as an intended use consented as allowed for respective said each data type used by said application;

identifying for at least some of said queried data when said application is permitted to access said at least some of said queried data, based on said plurality of usage purposes and data types;

sending said at least some of said queried data to said application, when said application is permitted to use said data of the queried data having data type permitted for a use purpose of said application; and preventing un-allowed use of data associated with said declared privacy information by said application, when said application is not permitted to use said data of the queried data having data type not permitted for a use purpose of said application, by not sending said data to said application.

17. The method of claim 16, wherein said purpose token is encrypted using a private key of a current runtime environment and said decrypting is done using a paired public key of said private key.

18. The method of claim 16, wherein said at least some of said queried data includes obfuscated version of said queried data.

19. The method of claim 16, wherein said verifying includes comparing said purpose token to user preferences stored in a dataset.

20. A computer readable medium comprising computer executable instructions, that when executed by a hardware processor, cause said hardware processor to:

receive from an application a query for data, requested for use by said application, and an encrypted purpose token of declared privacy information;

decrypt said encrypted declared privacy information;

extract from said declared privacy information, information specifying for each data type of a plurality of data types of data received or sent by said application, at least one use purpose allowed for said application to use said received or sent data of said each data type, wherein said allowed use purpose is predefined as an intended use consented as allowed for respective said each data type used by said application;

identify for at least some of said queried data when said application is permitted to access said at least some of said queried data, based on said plurality of usage purposes and data types;

send said at least some of said queried data to said application, when said application is permitted to use said data of the queried data having data type permitted for a use purpose of said application; and prevent un-allowed use of data associated with said declared privacy information by said application, when said application is not permitted to use said data of the queried data having data type not permitted for a use purpose of said application, by not sending said data to said application.

* * * * *